United States Patent Office 3,042,587
Patented July 3, 1962

3,042,587
STABILIZED DESOXYRIBONUCLEASE PREPARATION
Werner Baumgarten, North Hills, and Reginald F. Johnson, Morrisville, Pa., assignors to Merck & Co., Inc., Rahway, N.J., a corporation of New Jersey
No Drawing. Filed Nov. 29, 1960, Ser. No. 72,324
3 Claims. (Cl. 195—68)

This invention relates to the enzyme known as desoxyribonuclease and particularly to a procedure and a composition for its stabilization.

Desoxyribonuclease is used for the debridement of wounds and to reduce the tenacity and viscous composition of pulmonary secretions. Its usefulness for these purposes, however, is limited, due to its relative instability. During the time that it is stored, awaiting use, it will lose a greater portion of its activity and thus it will be ineffective for its intended purpose. This is true for both the lyophilized and the solution forms in which desoxyribonuclease is ordinarily prepared.

One suitable assay of the enzymatic activity of desoxyribonuclease involves the measurement of the decrease in viscosity of a substrate to which has been added a dilution of desoxyribonuclease to be tested. A substrate which may be selected for this assay is a highly polymerized desoxyribonucleic acid prepared from calf thymus according to procedures known in the art. Desoxyribonuclease possesses optimum enzymatic activity at a pH of 7.4 and requires $Mg^{++}$ or $Mn^{++}$ ions for activation. While pH 7.4 is optimal for enzymatic activity, the enzyme is most stable at acid pH's preferably 2.5–3.0. Consequently, if the enzyme is prepared at the low pH at which it is most stable, its enzymatic usefulness is greatly reduced.

In accordance with the invention it has been found that the addition of calcium, $Ca^{++}$, and barium, $Ba^{++}$, ions to the desoxyribonuclease, serves to stabilize the activity of the enzyme. Due to their presence, it has been found that the enzyme may be prepared and stored at a pH around 7.4, at which it is most active, without appreciable loss of potency.

The salt providing the calcium or barium ions should be one which is soluble in water such as the chloride or the acetate. It has been found that the chloride and principally calcium chloride has many preferred advantages.

If barium ions are to be used, they should be present in the same ionic amount mentioned below for calcium ions, having in mind that the atomic weight of barium is about three and one-half times greater than the atomic weight of calcium. The calcium ions are effective in as low a concentration as 1.35% based on the gram atomic weight of the calcium ion and the gram weight of the desoxyribonuclease present in the preparation. The increase of the calcium ion concentration above 4.2% has been found to be relatively ineffective and a concentration of 1.35% is preferred.

Data on the stability of pancreatic desoxyribonuclease solution is described as Table I. It will be observed that the addition of as small as 3.75% of $CaCl_2$ has a profound effect upon the stability of the enzyme solution. The addition of $CaCl_2$ in excess of 11.75% does not result in worthwhile increased stability.

TABLE I

*Influence of Calcium Ions Upon the Stability of Pancreatic Desoxyribonuclease [1] Solutions Stored at 3°, 21°, and 35° C.*

| | Percent Enzymatic Activity Accounted for After Storage at— | | | | | | | | |
|---|---|---|---|---|---|---|---|---|---|
| Period of Storage | 3° C. upon addition of— | | | 21° C. upon addition of— | | | 35° C. upon addition of— | | |
| | 0% $CaCl_2$ | 3.75% $CaCl_2$ | 11.75% $CaCl_2$ | 0% $CaCl_2$ | 3.75% $CaCl_2$ | 11.75% $CaCl_2$ | 0% $CaCl_2$ | 3.75% $CaCl_2$ | 11.75 $CaCl_2$ |
| One Week | 100 | 91 | 91 | 18 | 88 | 81 | 5 | 100 | 91 |
| Two Weeks | | | | | 88 | 100 | | 62 | 69 |
| Three Weeks | 76 | 91 | 100 | 11 | 79 | 87 | | 85 | 86 |
| One Month | 76 | 91 | 91 | 5 | 76 | 92 | 0 | 45 | 63 |
| Two Months | 59 | 75 | | | 59 | 72 | | 32 | 65 |
| Three Months | | | 77 | | 69 | 82 | | 48 | 75 |
| Five Months | 59 | 89 | 100 | | 59 | 100 | | 5 | 77 |

[1] The pancreatic desoxyribonuclease used in these studies is the regularly produced enzyme.

In Table II the effect of $Ca^{++}$ and $Ba^{++}$ ions upon pancreatic desoxyribonuclease solutions prepared from the crystalline enzyme was investigated. Under the conditions of the experiment, pH 6.7 and 31° C., both ions possessed profound stabilizing action.

TABLE II

*Effect of Calcium and Barium Ions Upon the Stability of Pancreatic Crystalline Desoxyribonuclease Solutions Stored at 31° C. and pH 6.7 [1]*

| Period of Storage in Hours | Percent Enzymatic Activity Accounted for after Storage upon addition of— | | |
|---|---|---|---|
| | Control | $CaCl_2$, 0.8% | $BaCl_2$, 1.7% |
| 3 | 0 | 100 | 100 |
| 26 | | 100 | 100 |
| 54 | | 75 | 90 |

[1] The pH of the enzyme solution was adjusted with sodium bicarbonate solution.

The addition of a barium or calcium salt to a solution of desoxyribonuclease which is to be lyophilized, has been found to stabilize the lyophilized product. This is shown by the Table III.

TABLE III

*Influence of Additives Upon the Stability of Lyophilized Pancreatic Desoxyribonuclease Stored at 35° C.*

| Period of Storage | Percent Enzymatic Activity Accounted for Upon Addition of— | | |
|---|---|---|---|
| | Control [1] | Mannitol [2] | Mannitol [3] plus calcium glycerophosphate |
| One Week | 87 | 69 | 97 |
| One Month | 81 | 34 | 84 |
| Three Months | 34 | 40 | 110 |
| Six Months | 28 | 22 | 97 |
| Twelve Months | 14 | neg. | 76 |

[1] Commercial Product, pH 2.9.
[2] Ten grams of mannitol per liter of sterile bulk, pH 2.9.
[3] Ten grams of mannitol, 20 grams sodium glycerophosphate, five hundred mg. $CaCl_2$ anhydrous per liter of sterile bulk, pH 7.3.

Table III shows that the addition of mannitol alone does not increase the stability of the desoxyribonuclease. The mannitol was added to give a better appearing lyophilized product.

A glycerophosphate buffer was chosen for maintaining a neutral pH. Contrary to the ordinary phosphate buffer, phosphate is not precipitated upon addition of Ca or Ba ions which is an important advantage. Table III shows in its last column that the calcium ions have a stabilizing effect upon the enzyme.

The product of the last column of Table III is useful as a commercial product. It may be sold in this composition in sealed ampules, for subsequent restoration with water or a saline solution. The resulting solution will have a prolonged useful life while awaiting use, due to the presence of the calcium ions. This preparation may be made without the mannitol if the unattractive appearance of the product is immaterial. Barium chloride may be substituted for the calcium chloride.

This is a continuation-in-part application of our application Serial No. 800,115 filed on March 18, 1959, now abandoned.

What is claimed is:

1. The method of stabilizing a preparation containing pancreatic desoxyribonuclease which comprises adding to it a salt having its cation selected from the group consisting of calcium and barium, the salt being added in an amount such that the calcium ions are present in the range of 1.35% to 4.2% and the barium ions are present in the range of 4.7% to 14.8% by weight based on the desoxyribonuclease.

2. A method according to claim 1 in which the salt is calcium chloride.

3. A method according to claim 1 in which the salt is calcium chloride and is present in the amount of from 3.75% to 11.75% of desoxyribonuclease, by weight.

References Cited in the file of this patent

UNITED STATES PATENTS

| 2,677,642 | Ablondi et al. | May 4, 1954 |
| 2,978,385 | Damaskus | Apr. 4, 1961 |

OTHER REFERENCES

Archives of Biochemistry and Biophysics, vol. 32, pages 414 to 423 (1951), vol. 73, pages 337–358 (February 1958).